(12) United States Patent
Zhao et al.

(10) Patent No.: US 11,734,374 B2
(45) Date of Patent: Aug. 22, 2023

(54) SYSTEMS AND METHODS FOR INSERTING LINKS

(71) Applicant: Walmart Apollo, LLC, Bentonville, AR (US)

(72) Inventors: Xia Zhao, Santa Clara, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,490

(22) Filed: Jan. 31, 2021

(65) Prior Publication Data
US 2022/0245205 A1 Aug. 4, 2022

(51) Int. Cl.
*G06F 16/954* (2019.01)
*G06F 16/9035* (2019.01)
(Continued)

(52) U.S. Cl.
CPC ........ *G06F 16/954* (2019.01); *G06F 16/9035* (2019.01); *G06F 16/90332* (2019.01); *G06F 16/9558* (2019.01); *G06F 40/40* (2020.01)

(58) Field of Classification Search
CPC ............... G06F 16/954; G06F 16/9558; G06F 16/90332; G06F 16/9035; G06F 40/40
(Continued)

(56) References Cited

U.S. PATENT DOCUMENTS 8,255,786 B1 * 8/2012 Gattani ................. G06F 16/955
715/208

2012/0030264 A1 * 2/2012 Horn ................... G06F 3/04845
707/821
(Continued)

FOREIGN PATENT DOCUMENTS

CN 111858517 A * 10/2020

OTHER PUBLICATIONS

Köse, Ozan. "Crypto asset taxonomy classification and crypto news sentiment analysis." Master's thesis, Middle East Technical University, 2020., pp. 24-32 (Year: 2020).*
(Continued)

*Primary Examiner* — Taylor A Elfervig
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform: determining one or more similarity scores between at least two of: a first item in a hierarchical categorization containing items; a category in the hierarchical categorization; or a topic; filtering out at least one potential match from one or more potential matches using the one or more similarity scores; ranking the one or more potential matches, as filtered, using the one or more similarity scores; re-ranking the one or more potential matches, as filtered, using additional data about at least one of: the first item in the hierarchical categorization containing the items; the category in the hierarchical categorization; or the topic; and inserting one or more hyperlinks into an anchor webpage, the one or more hyperlinks configured to navigate a user from an anchor webpage to one or more potential match webpages associated with the one or more potential matches, as filtered and re-ranked. Other embodiments are disclosed herein.

20 Claims, 5 Drawing Sheets

(51) Int. Cl.
*G06F 16/9032* (2019.01)
*G06F 16/955* (2019.01)
*G06F 40/40* (2020.01)

(58) Field of Classification Search
USPC .......................................... 709/203–206, 223
See application file for complete search history.

(56) References Cited

U.S. PATENT DOCUMENTS

| | | | |
|---|---|---|---|
| 2014/0289232 A1* | 9/2014 | Lu | G06F 16/24573 707/723 |
| 2019/0065589 A1 | 2/2019 | Wen et al. | |
| 2019/0121867 A1* | 4/2019 | Misra | G06Q 10/067 |
| 2020/0334496 A1* | 10/2020 | Hoffman | G06F 40/30 |
| 2020/0410157 A1* | 12/2020 | van de Kerkhof | G06F 40/166 |
| 2021/0365500 A1* | 11/2021 | Gunaselara | G06F 16/3329 |

OTHER PUBLICATIONS

P. Ghosh and S. Sen, "Time and location based summarized PageRank calculation of Web pages," 2014 IEEE International Conference on Industrial Technology (ICIT), Busan, Korea (South), 2014, pp. 788-791 (Year: 2014).*

P. Jiang, W. Zhou and Y. Li, "A Similarity Calculation Model of Weak Link Web Pages Based on Keyword Location Influence," 2020 IEEE 3rd International Conference on Information Systems and Computer Aided Education (ICISCAE), Dalian, China, 2020, pp. 62-67 (Year: 2020).*

Blanckenberg, N., "Ultimate List of Link Building Strategies for eCommerce," obtained from https://www.business2community.com/ecommerce/ultimate-list-of-link-building-strategies-for-ecommerce-02194074 on Jan. 1, 2021; published Apr. 25, 2019, 19 pgs. Apr. 25, 2019.

Uppal, S., "Similar Products Recommendation and Ranking of Products," obtained from https://medium.com/@shauryauppal/similar-products-recommendation-and-ranking-of-products-83ec14305ec, on Jan. 1, 2021; published Sep. 19, 2019; 8 pgs Sep. 19, 2019.

Enge, E., "How Google's Search Results Work: Crawing, Indexing, and Ranking," obtained from https://blogs.perficient.com/2016/12/21/how-googles-search-results-work-crawling-indexing-and-ranking on Jan. 1, 2021; published Dec. 21, 2016; 15 pgs Dec. 21, 2016.

* cited by examiner

SYSTEMS AND METHODS FOR INSERTING LINKS

TECHNICAL FIELD

This disclosure relates generally to automatically generating customized websites, and more particularly to automatically inserting links into a webpage of a website.

BACKGROUND

Websites are the backbone of modern communication technologies, but many times a specific website can be difficult to find. This is especially true for individual webpages within a website (e.g., an item webpage within a larger eCommerce website) because these webpages often have various paths, parameters, hashes, and other long strings of characters appended after the domain name. Due to this problem with complex URLs (uniform resource locators), many users of web sites locate individual webpages they want to visit using a search engine to search for keywords in the webpage. Search engines then use a variety of metrics and algorithms to provide a user with a ranked list of webpages based on these keywords.

While most search engine algorithms are confidential, it is known that websites with easy-to-navigate webpages are ranked higher in results lists than websites that are harder to navigate. This is especially true for websites where it is easy to navigate between webpages within a website. A higher ranking, in turn, leads to more users finding and eventually navigating to the website.

In view of the above, there is a need for a system and method for enhancing the navigability of websites and webpages.

BRIEF DESCRIPTION OF THE DRAWINGS

To facilitate further description of the embodiments, the following drawings are provided in which.

Figure 1:
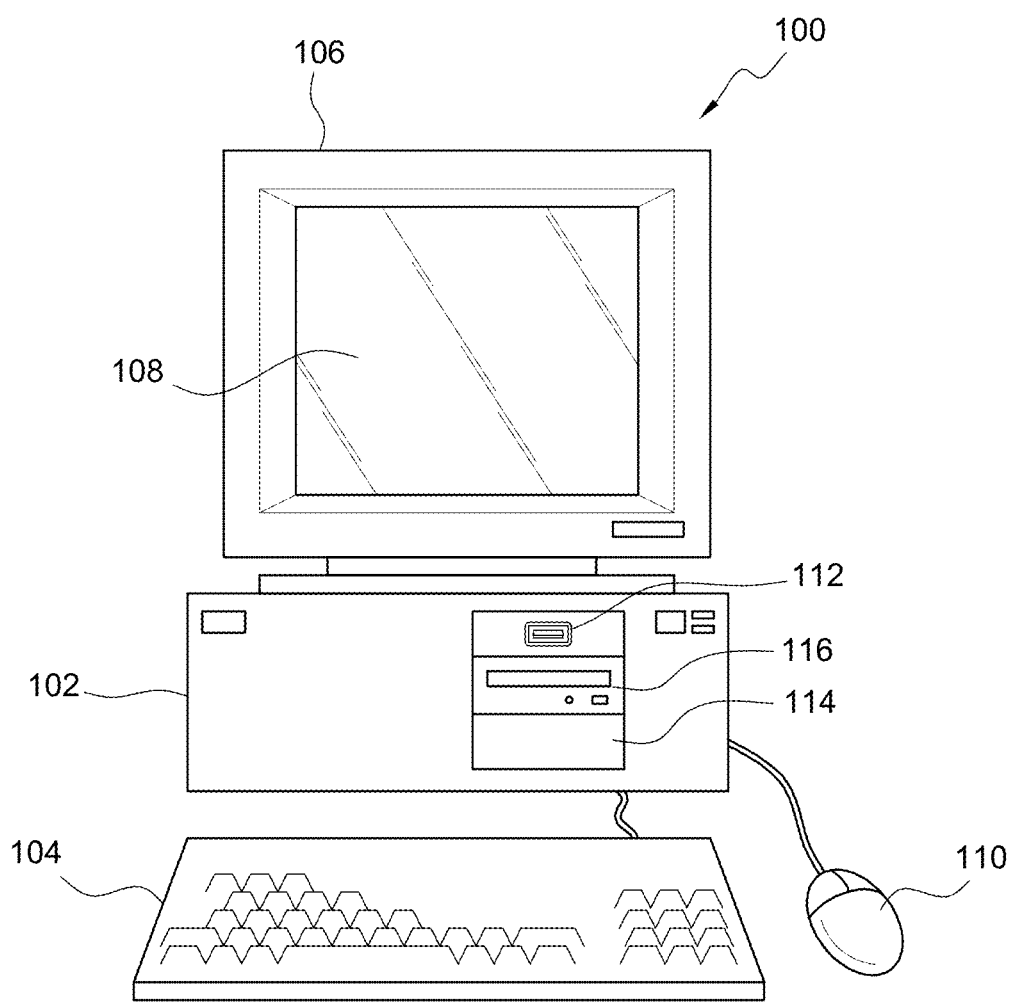
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform determining one or more similarity scores between at least two of: a first item in a hierarchical categorization containing items; a category in the hierarchical categorization; or a topic; filtering out at least one potential match from one or more potential matches using the one or more similarity scores; ranking the one or more potential matches, as filtered, using the one or more similarity scores; re-ranking the one or more potential matches, as filtered, using additional data about at least one of: the first item in the hierarchical categorization containing the items; the category in the hierarchical categorization; or the topic; and inserting one or more hyperlinks into an anchor webpage, the one or more hyperlinks configured to navigate a user from an anchor webpage to one or more potential match webpages associated with the one or more potential matches, as filtered and re-ranked.

Various embodiments include a method. The method can be implemented via execution of computing instructions configured to run at one or more processors and configured to be stored at non-transitory computer-readable media The method can comprise determining one or more similarity scores between at least two of: a first item in a hierarchical categorization containing items; a category in the hierarchical categorization; or a topic; filtering out at least one potential match from one or more potential matches using the one or more similarity scores; ranking the one or more potential matches, as filtered, using the one or more similarity scores; re-ranking the one or more potential matches, as filtered, using additional data about at least one of: the first item in the hierarchical categorization containing the items; the category in the hierarchical categorization; or the topic; and inserting one or more hyperlinks into an anchor webpage, the one or more hyperlinks configured to navigate a user from an anchor webpage to one or more potential match webpages associated with the one or more potential matches, as filtered and re-ranked.

Figure 2:
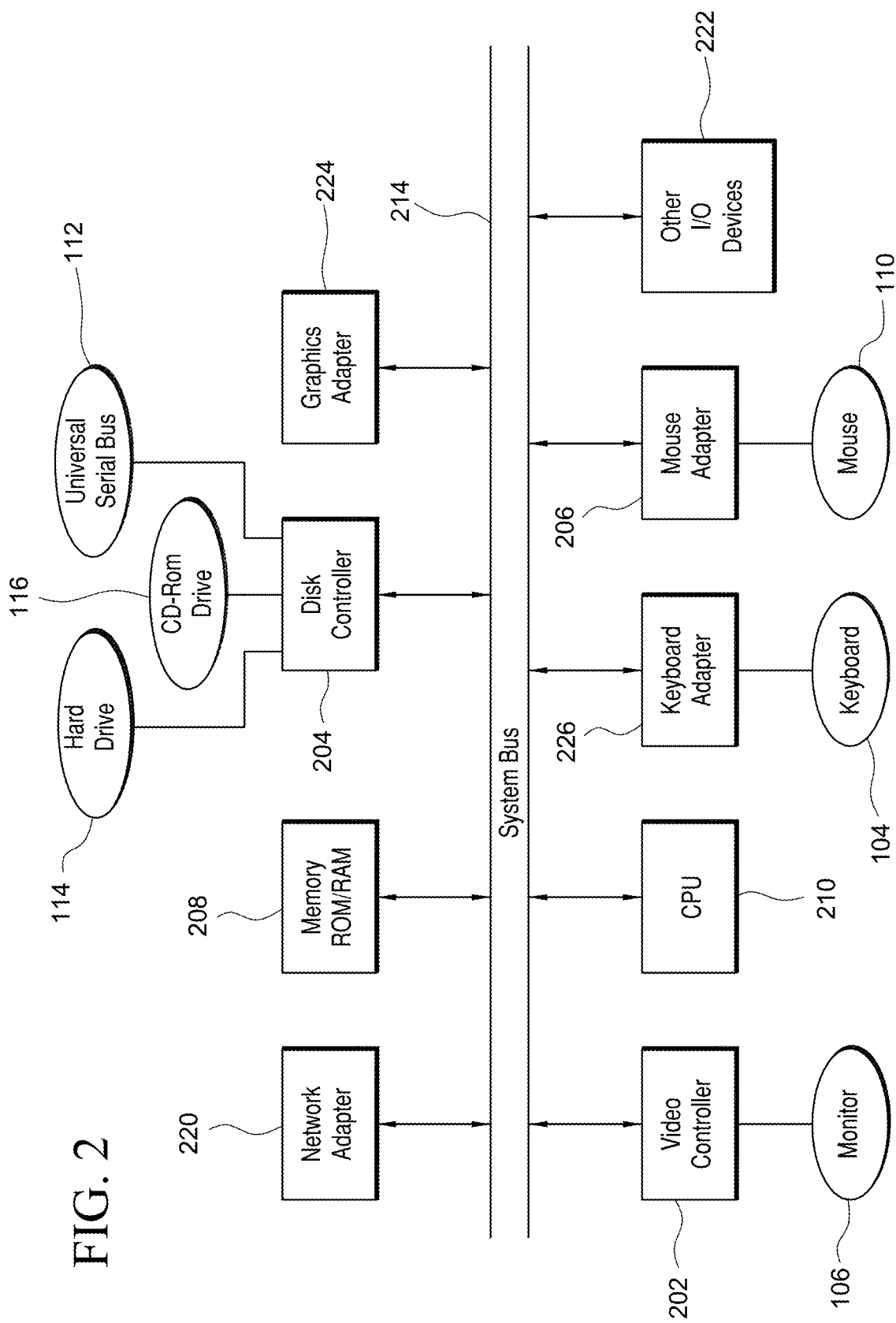
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown) or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
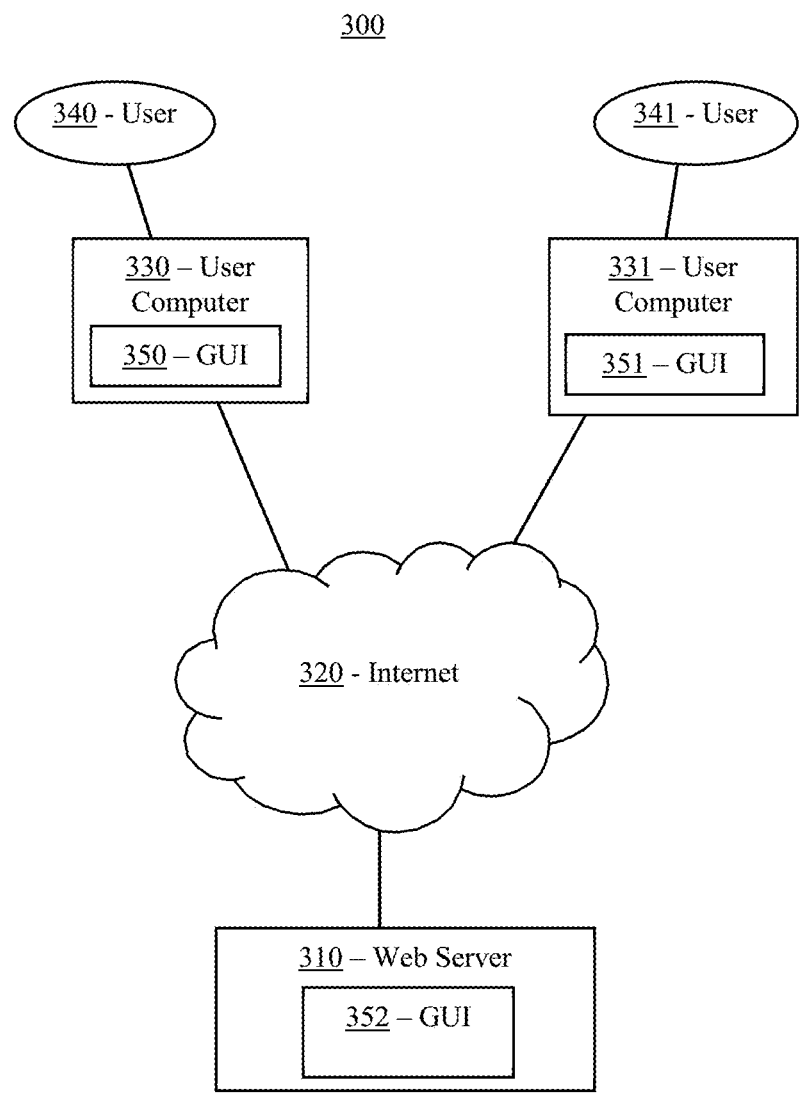
FIG. 3 illustrates a representative block diagram of a system, according to an embodiment.

Turning ahead in the drawings, FIG. 3 illustrates a block diagram of a system 300 that can be employed for altering a GUI (graphical user interface), as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise GUI 350, 351, 352. In the same or different embodiments, GUI 350, 351, 352 can be part of and/or displayed by user computers 330, 331, which also can be part of system 300. In some embodiments, GUI 350, 351, 352 can comprise text and/or graphics (images) based user interfaces. In the same or different embodiments, GUI 350, 351, 352 can comprise a heads up display ("HUD"). When GUI 350, 351, 352 comprises a HUD, GUI 350, 351, 352 can be projected onto a medium (e.g., glass, plastic, etc.), displayed in midair as a hologram, or displayed on a display (e.g., monitor 106 (FIG. 1)). In various embodiments, GUI 350, 351, 352 can be color, black and white, and/or greyscale. In many embodiments, GUI 350, 351, 352 can comprise an application running on a computer system, such as computer system 100 (FIG. 1), user computers 330, 331, and/or web server 310. In the same or different embodiments, GUI 350, 351, 352 can comprise a website accessed through internet 320. In some embodiments, GUI 350, 351, 352 can comprise an eCommerce website. In these or other embodiments, GUI 352 can comprise an administrative (e.g., back end) GUI allowing an administrator to modify and/or change one or more settings in system 300. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc. In many embodiments, GUI 350, 351, 352 can comprise one or more GUI elements. In these or other embodiments, a GUI element can comprise a customizable portion of a GUI (e.g., a button, a text entry box, a hyperlink, an image, a text block, etc.). In various embodiments, a GUI element can be selectable by a user 340, 341 and/or interactive.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with one another. In various embodiments, web server 310 and/or user computers 330, 331 can communicate or interface (e.g., interact) with each other through a network or internet 320. In these or other embodiments, internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 also can be configured to communicate with one or more databases. In various embodiments, one or more databases can comprise a product database that contains information about products, items, or SKUs (stock keeping units) sold by a retailer. In many embodiments, one or more databases can comprise information about interactions of user computers 330, 331 with GUIs 350, 351. For example, the one or more databases can store past (e.g., historical) interactions of user computers 330, 331 with GUIs 350, 351. In many embodiments, interactions can be tied to a unique identifier (e.g., an IP address, an advertising ID, device ID, etc.) and/or a user account. In embodiments where a user 340, 341 interacts with GUIs 350, 351 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). In some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

In many embodiments, one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for a webpage and/or website that is easier to navigate. In these or other embodiments, this easier to navigate website can also provide for a higher ranking when the website is returned by a search engine in response to a user search.

In a number of embodiments, the techniques described herein can solve a technical problem that arises only within the realm of computer networks, as webpages and websites do not exist outside the realm of computer networks.

Figure 4:
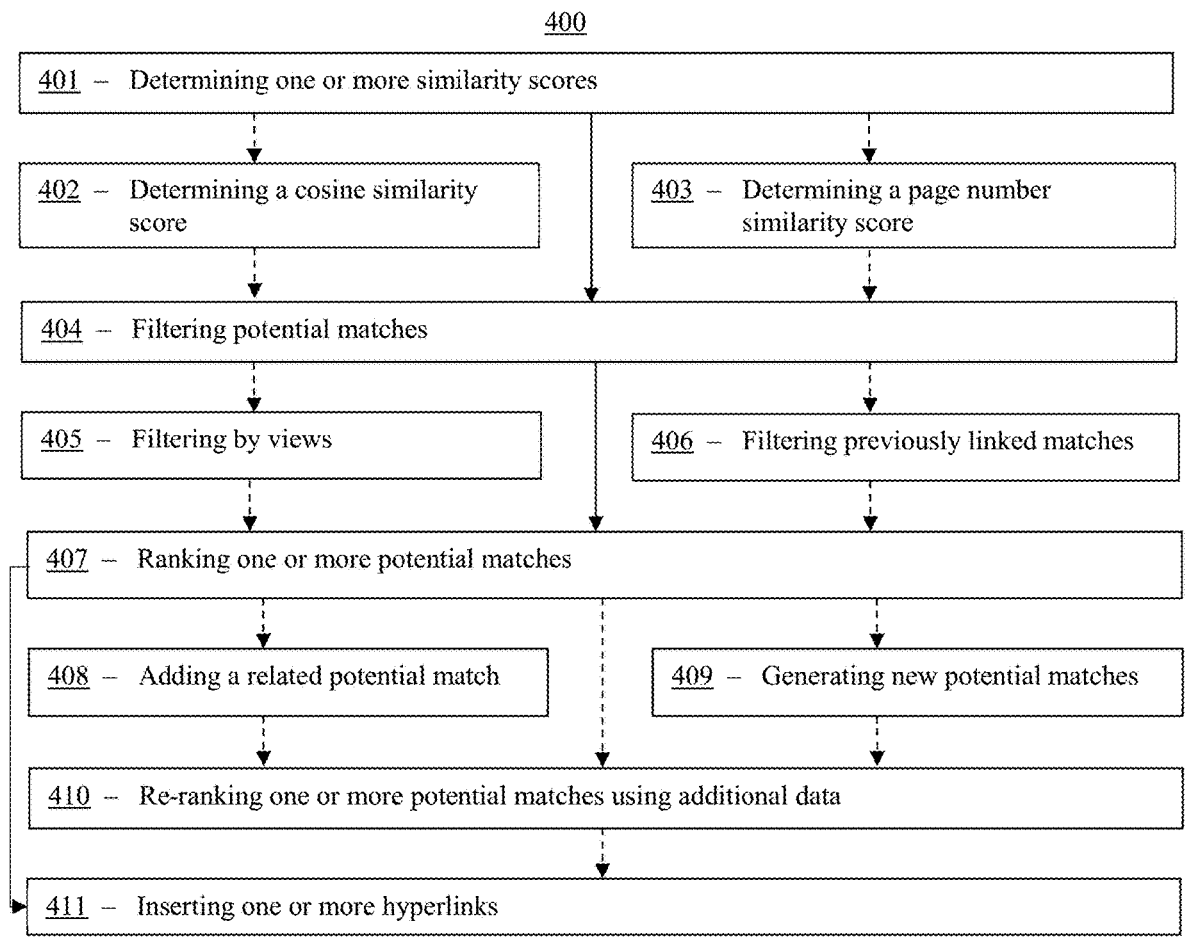
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3) and/or user computers 330, 331 (FIG. 3). The processing module(s) can be similar or identical to the processing module(s) described above with respect to computer system 100 (FIG. 1).

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3) and/or user computer 330, 331 (FIG. 3). The processing module(s) can be similar or identical to the processing module(s) described above with respect to computer system 100 (FIG. 1).

In many embodiments, method 400 can comprise an activity 401 of determining one or more similarity scores. In various embodiments, a similarity score can be determined between two or more of an item in a hierarchical categorization, a category in the hierarchical categorization, or a topic. In various embodiments, one component of a similarity score pair can be referred to as an anchor while the other component can be referred to as a potential match. For example, an item can comprise an anchor and a category can comprise a potential match. As another example, a category can comprise an anchor and a topic can comprise a potential match. In many embodiments, a similarity score can be determined between an anchor and each of a plurality of potential matches. For example, a similarity score can be determined between an anchor item and each potential match category of a hierarchical categorization.

In these or other embodiments, a topic can comprise a keyword entered into one or more search engines. In some embodiments, topics (e.g., keywords) can be identified by a third party entity extraneous to system 300. For example, batches of keywords can be purchased from or given by these third party entities.

In the same or different embodiments, a hierarchical categorization can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, an item taxonomy can be received from a computer administered from or by system 300 (FIG. 3). In these or other embodiments, an item taxonomy can be received from a third-party system or vendor.

Several different types of similarity scores can be determined during activity 401 and/or one of its sub-activities. For example, an item-item similarity score, an item-category relevance score (e.g., a page number similarity score), an item-category similarity score, a category-topic similarity score, and/or a category-category similarity score can be determined. A similarity score can generally be configured to be a measure of similarity between two or more of an item in a hierarchical categorization, a category in the hierarchical categorization, or a topic. In many embodiments, two components of a similarity score can be considered similar when their similarity score is above a threshold similarity score. In these or other embodiments, a threshold similarity score can be set by an administrator of system 300 (FIG. 3). In various embodiments, a list of potential matches for an anchor can be constructed using a list of similarity scores.

In various embodiments, a number of transformations can be performed on datasets associated with an item, a category, or a topic and that transformed data can be used to generate similarity scores. For example, various signals associated with an item, a category, or a topic can be converted into vector form, and then a similarity score can be determined using that vector. In many embodiments, two similar vectors will be closer to each other in vector space (e.g., will have a higher similarity score) than two dissimilar vectors. While specific embodiments are disclosed below in activities 402-403, a skilled artisan will understand that other types of similarity scores can be determined using datasets disclosed herein. For example, a Jaccard's distance can be determined and/or one or more nearest neighbors can be determined.

In some embodiments, method 400 can optionally comprise activity 402 of determining a cosine similarity score. In many embodiments, activity 402 can be performed at the same time or as a part of activity 401. In these or other embodiments, activity 402 can be performed at the same time as activity 403. In various embodiments, an item-item similarity score, an item-category similarity score, a category-item similarity score, a category-topic similarity score, and/or a category-category similarity score can comprise cosine similarities. In these or other embodiments, a cosine similarity can be determined using a co-occurrence database (e.g., a co-occurrence matrix). In many embodiments, a co-occurrence database can store vectors indicating a number of times pairs of items were viewed by a user during a user session.

In these or other embodiments, a user session can comprise a browsing session on a website. In various embodiments, a user session can comprise interactions with a computer program (e.g., a mobile application) that occur beginning from when the program is opened to when the program is closed. It will be understood that while many user sessions end when a GUI is closed (e.g., by navigating away from a website or closing a program), user sessions can persist after closure of the GUI. For example, it can be considered one user session when a user opens a GUI, closes the GUI, and then a short time later re-opens the GUI. What is considered a user session can be determined by an administrator of system 300 (FIG. 3) based on the specifications and/or constraints of the system and its administrator.

In many embodiments, a cosine similarity can be calculated using normalized co-view counts between two items. In these or other embodiments, a cosine similarity between item A and item B can be calculated using an equation comprising:

$$\mathrm{cosine}(A, B) = \frac{A \text{ and } B \text{ coview session count}}{\sqrt{A \text{ session view count} * B \text{ session view count}}}$$

In this way, items that are viewed together with at a higher frequency can have a higher cosine similarity than items that are viewed together at a lower frequency.

In some embodiments, method 400 can optionally comprise activity 403 of determining a page number similarity score. In many embodiments, a page number similarity score can be determined between an item and a category. In these or other embodiments, a page number similarity score can be determined using a piecewise function. For example, an item falling on a first page of a category browse website can be assigned a highest page number similarity score, an item falling on a second or third page of a category can be assigned a middle page number similarity score, and an item falling below a third page can be assigned a low page number similarity score. Table 1 below shows an exemplary piecewise function that can be used in activity 403.

TABLE 1

| Average Page Number | Page Number Similarity Score |
|---|---|
| (, 1] | 1 |
| (1, 2] | 0.8 |
| (2, 5] | 0.3 |
| (5, 10] | 0.1 |
| 10 and above | 0 |

In many embodiments, method 400 can comprise an activity 404 of filtering potential matches. In many embodiments, filtering potential matches can comprise removing one or more potential matches from a list of potential matches for an anchor. In other words, potential matches for an anchor can be narrowed down by filtering them according to the techniques described herein. Potential matches can be filtered for a number of reasons. For example, some similarity scores can indicate that a pair is similar even though the pair is not similar. As another example, it could be considered duplicative for similar pairs that have already been linked together with navigational links in a previous process to be linked a second time.

In some embodiments, method 400 can optionally comprise an activity 405 of filtering by views. In many embodiments, activity 405 can be performed at the same time or as a part of activity 404. In these or other embodiments, filtering by views can comprise removing potential matches based on a number of co-views between an anchor and the potential match. For example, potential matches with less than a threshold number of co-views (e.g., who have a less than a threshold number of entries in a co-occurrence database) with an anchor can be removed from a list of potential matches. In some embodiments, a threshold number of views can be set by an administrator of system 300 (FIG. 3).

In some embodiments, method 400 can optionally comprise an activity 406 of filtering previously linked matches. In many embodiments, activity 406 can be performed at the same time or as a part of activity 404. In these or other embodiments, previously linked matches can comprise potential matches for an anchor that are already linked together (e.g., via a navigational hyperlink). For example, if a category has already been linked with an item, then that item can be removed from a list of potential matches for that item.

In many embodiments, method 400 can comprise an activity 407 of ranking one or more potential matches. In these or other embodiments, ranking one or more potential matches can comprise ranking one or more potential matches for an item using the one or more similarity scores. For example, potential matches for an anchor can be ranked from highest to lowest similarity score. In many embodiments, after activity 407, method 400 can proceed directly to activity 411, described below. In other embodiments, one or more of activities 408-410, described below, can be performed after activity 407. For example, activity 408 can be performed when below a threshold number of potential matches remain after one or more of activities 404-406.

In some embodiments, method 400 can optionally comprise activity 408 of adding a related potential match. In many embodiments, a related potential match for an anchor can be determined using a similarity score, as described above. For example, when an anchor is an item and a potential match is a category, related potential matches can be determined using similarity scores between an item's category and other categories in the hierarchical categorization (e.g., a category-category similarity score). In various embodiments, related potential matches can be ranked by a similarity score, and a top N number of potential matches can be added to a list of potential matches. In these or other embodiments, related potential matches can be added to a list of potential matches for an anchor until a predetermined number of potential matches are on the list.

In some embodiments, method 400 can optionally comprise activity 409 of generating new potential matches. In many embodiments, new potential matches can comprise potential matches with little or no data in a co-occurrence database, as described above. For example, newly generated topics or topics filtered out in activities 404-405 can be new potential matches. In various embodiments, new potential matches can be ranked using a predictive algorithm (e.g., a machine learning algorithm). In these or other embodiments, a predictive algorithm can be configured to analyze data about new potential matches and rank them based on a probability of association with an anchor.

In many embodiments, a predictive algorithm can comprise a bidirectional encoder representations from transformers (BERT) natural language processing algorithm. In these or other embodiments, a BERT natural language processing algorithm can be trained, at least in part, on natural language describing the new potential matches. For example, when a new potential match is a topic, search engine marketing data can be used to train a BERT natural language processing algorithm. In these or other embodiments, search engine marketing data can comprise click data for a keyword.

In some embodiments, method 400 can optionally comprise activity 410 of re-ranking one or more potential matches using additional data. In these or other embodiments, re-ranked potential matches can include new potential matches and/or related potential matches as descried in activities 408 and 409. In various embodiments, additional data can comprise a search engine ranking data and/or click-through data for a keyword. For example, a potential match that is already highly ranked on a search engine results page can be downranked. In many embodiments, potential matches can be re-ranked from lowest search engine rank to highest search engine rank. In these or other embodiments, potential matches can be re-ranked to put lower trafficked pages first while higher trafficked pages are left as a lower ranking.

In many embodiments, method 400 can comprise an activity 411 of inserting one or more hyperlinks. In these or other embodiments, one or more hyperlinks can be inserted into an anchor webpage. In various embodiments, an anchor webpage can comprise a view item page when the anchor is an item, a view/browse category page when the anchor is a category, or a view topic page when an anchor is a topic. In some embodiments, an anchor webpage can be configured to navigate a user from an anchor webpage to a potential match webpage. In many embodiments, a potential match webpage can comprise a view item page when the potential match is an item, a view/browse category page when the potential match is a category, or a view topic page when a potential match is a topic. In these or other embodiments, one or more hyperlinks can be inserted into a webpage in an order as ranked in activity 407 or re-ranked in activity 410. In various embodiments, one or more hyperlinks can be configured to be read by one or more web scrapers (e.g., search engine bots). In this way, search engine rankings can be enhanced and it will be easier for users to locate the anchor page and the potential match page. In some embodiments, one or more hyperlinks can be embedded into one or more GUI elements (e.g., elements of GUIs 350, 351 (FIG. 3).

Figure 5:
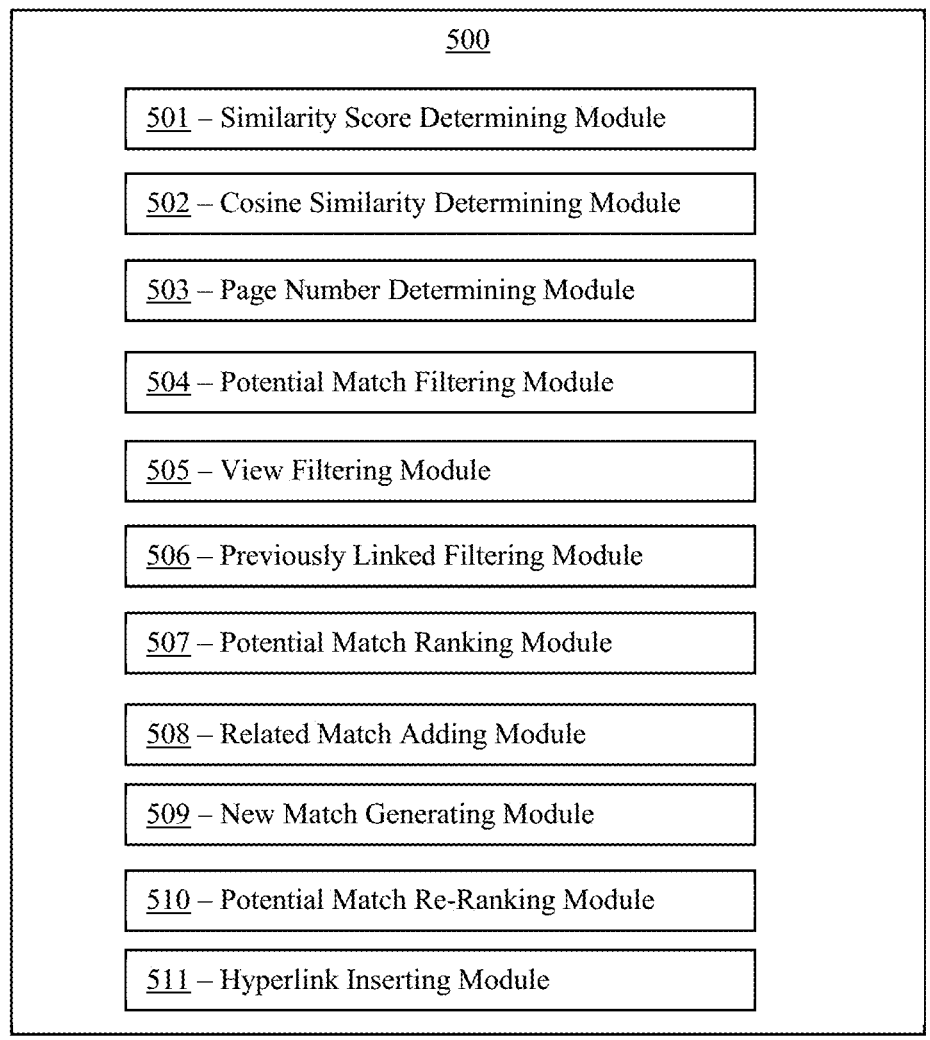
FIG. 5 illustrates a representative block diagram of a system, according to an additional embodiment.

Turning ahead in the drawings, FIG. 5 illustrates a block diagram of a system 500 that can be employed for inserting a link. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500. In many embodiments, one or more portions of system 500 can be implemented by one or more of web server 301 (FIG. 3) and/or user device 330, 331.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as similarity score determining module 501. In many embodiments, similarity score determining module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as cosine similarity determining module 502. In many embodiments, cosine similarity determining module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as page number determining module 503. In many embodiments, page number determining module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as potential match filtering module 504. In many embodiments, potential match filtering module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as view filtering module 505. In many embodiments, view filtering module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as previously linked filtering module 506. In many embodiments, previously linked filtering module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as potential match ranking module 507. In many embodiments, potential match ranking module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as related match adding module 508. In many embodiments, related match adding module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as new match generating module 509. In many embodiments, new match generating module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as potential match re-ranking module 510. In many embodiments, potential match re-ranking module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as hyperlink inserting module 511. In many embodiments, hyperlink inserting module 511 can store computing instructions configured to run on one or more processing modules and perform one or more acts of method 400 (FIG. 4) (e.g., activity 411 (FIG. 4)).

Although systems and methods for inserting links have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions, when executed on the one or more processors, cause the one or more processors to perform functions comprising:
  determining one or more similarity scores between at least two or more items, wherein:
    a similarity score pair comprises an anchor item and one or more respective potential matches, in at least one of:
      a first item in a hierarchical categorization containing items, wherein the hierarchical categorization comprises levels of item taxonomies, wherein the levels of the item taxonomies are configured to classify the items based on respective properties of each item of the items, and wherein deeper levels of an item taxonomy go deeper into respective sub-categories of each category in the item taxonomy; or
      a keyword; and
    determining the one or more similarity scores comprises:
      determining, using a piecewise function, a page number similarity score between each item and one or more of its respective sub-categories of the respective sub-categories in the item taxonomy;
  filtering out, by a number of co-views between the anchor item and each one of the one or more respective potential matches, at least one potential match from the one or more respective potential matches using the one or more similarity scores, and removing each of the one or more respective potential matches that do not exceed a threshold number of co-views, wherein a co-view comprises pairs of items viewed in a browsing session on a website;
  ranking the one or more respective potential matches, as filtered and removed, using the one or more similarity scores;
  re-ranking the one or more respective potential matches, as filtered and removed, using additional data comprising search engine optimization data; and
  inserting one or more hyperlinks into an anchor webpage, the one or more hyperlinks configured to navigate a user from the anchor webpage to one or more potential match webpages associated with the one or more respective potential matches, as filtered and removed and re-ranked.

2. The system of claim 1, wherein determining the one or more similarity scores further comprises:
determining one or more cosine similarities between the at least two or more items in at least two of:
  the first item in the hierarchical categorization containing the items;
  the first item's respective sub-categories of the respective sub-categories in the hierarchical categorization; or
  the keyword.

3. The system of claim 1, wherein
determining the page number similarity score of between each item and its respective sub-categories of the respective sub-categories in the item taxonomy comprises:

assigning a hierarchical page number similarity score to each page of a respective website comprising each item.

4. The system of claim 1, wherein:
filtering out the at least one potential match from the one or more respective potential matches comprises:
removing potential matches previously linked with the anchor item.

5. The system of claim 1, wherein the search engine optimization data comprises at least one of:
the first item in the hierarchical categorization containing the items;
the first item's respective sub-categories of the sub-categories in the hierarchical categorization; or
the keyword.

6. The system of claim 1, wherein the one or more computing instructions, when executed on the one or more processors, further cause the one or more processors to perform functions comprising:
before re-ranking the one or more respective potential matches, using a predictive algorithm trained on natural language data to determine one or more new respective potential matches; and
combining the one or more new respective potential matches with a list of the one or more respective potential matches ranked by the one or more similarity scores.

7. The system of claim 6, wherein the predictive algorithm comprises a natural language processing algorithm.

8. The system of claim 1, wherein the one or more hyperlinks are configured to be read by one or more web scrapers.

9. The system of claim 1, wherein the one or more computing instructions, when executed on the one or more processors, further cause the one or more processors to perform an additional function comprising:
adding one or more new respective potential matches to a list of the one or more respective potential matches ranked by the one or more similarity scores.

10. The system of claim 1, wherein the one or more hyperlinks comprise two or more hyperlinks configured to navigate a user between the anchor webpage and the one or more potential match webpages, wherein the anchor webpage comprises:
a view item page when the anchor webpage is for the anchor item;
a view-browse category page when the anchor webpage is for the respective sub-categories of the anchor item; or
a view topic page when the anchor webpage is for the keyword.

11. A method being implemented via execution of computing instructions configured to run on one or more processors and stored at non-transitory computer-readable media, the method comprising:
determining one or more similarity scores between at least two or more items, wherein:
a similarity score pair comprises an anchor item and one or more respective potential matches, in at least one of:
a first item in a hierarchical categorization containing items, wherein the hierarchical categorization comprises levels of item taxonomies, wherein the levels of the item taxonomies are configured to classify the items based on respective properties of each item of the items, and wherein deeper levels of an item taxonomy go deeper into respective sub-categories of each category in the item taxonomy; or
a keyword; and
determining the one or more similarity scores comprises:
determining, using a piecewise function, a page number similarity score between each item and one or more of its respective sub-categories of the respective sub-categories in the item taxonomy;
filtering out, by a number of co-views between the anchor item and each one of the one or more respective potential matches, at least one potential match from the one or more respective potential matches using the one or more similarity scores, and removing each of the one or more respective potential matches that do not exceed a threshold number of co-views, wherein a co-view comprises pairs of items viewed in a browsing session on a web site;
ranking the one or more respective potential matches, as filtered and removed, using the one or more similarity scores;
re-ranking the one or more respective potential matches, as filtered and removed, using additional data comprising search engine optimization data; and
inserting one or more hyperlinks into an anchor webpage, the one or more hyperlinks configured to navigate a user from the anchor webpage to one or more potential match webpages associated with the one or more respective potential matches, as filtered and removed and re-ranked.

12. The method of claim 11, wherein determining the one or more similarity scores further comprises:
determining one or more cosine similarities between the at least two or more items in at least two of:
the first item in the hierarchical categorization containing the items;
the first item's respective sub-categories of the respective sub-categories in the hierarchical categorization; or
the keyword.

13. The method of claim 11, wherein
determining the page number similarity score of between each item and its respective sub-categories of the respective sub-categories in the item taxonomy comprises:
assigning a hierarchical page number similarity score to each page of a respective website comprising each item.

14. The method of claim 11, wherein:
filtering out the at least one potential match from the one or more respective potential matches comprises:
removing potential matches previously linked with the anchor item.

15. The method of claim 11, wherein the search engine optimization data comprises at least one of:
the first item in the hierarchical categorization containing the items;
the first item's respective sub-categories of the sub-categories in the hierarchical categorization; or
the keyword.

16. The method of claim 11, further comprising:
before re-ranking the one or more respective potential matches, using a predictive algorithm trained on natural language data to determine one or more new respective potential matches; and combining the one or more new respective potential matches with a list of the one or more respective potential matches ranked by the one or more similarity scores.

17. The method of claim 16, wherein the predictive algorithm comprises a natural language processing algorithm.

18. The method of claim 11, wherein the one or more hyperlinks are configured to be read by one or more web scrapers.

19. The method of claim 11, further comprising:
adding one or more new potential matches to a list of the one or more respective potential matches ranked by the one or more similarity scores.

20. The method of claim 11, wherein the one or more hyperlinks comprise two or more hyperlinks configured to navigate a user between the anchor webpage and the one or more potential match webpages, wherein the anchor webpage comprises:
a view item page when the anchor webpage is for the anchor item;
a view-browse category page when the anchor webpage is for the respective sub-categories of the anchor item; or
a view topic page when the anchor webpage is for the keyword.

* * * * *